US008385306B2

(12) United States Patent
Che et al.

(10) Patent No.: US 8,385,306 B2
(45) Date of Patent: Feb. 26, 2013

(54) POWER CONTROL ARRANGEMENT FOR LONG TERM ELVOLUTION TIME DIVISION DUPLEX METHOD AND APPARATUS

(75) Inventors: Xiang Guang Che, Beijing (CN); Kari Pekka Pajukoski, Oulu (FI); Peter Skov, Beijing (CN); Esa Tapani Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 303 days.

(21) Appl. No.: 12/866,380

(22) PCT Filed: Feb. 4, 2009

(86) PCT No.: PCT/IB2009/000201
§ 371 (c)(1),
(2), (4) Date: Aug. 5, 2010

(87) PCT Pub. No.: WO2009/098574
PCT Pub. Date: Aug. 13, 2009

(65) Prior Publication Data
US 2010/0322099 A1    Dec. 23, 2010

Related U.S. Application Data

(60) Provisional application No. 61/006,900, filed on Feb. 5, 2008.

(51) Int. Cl.
*H04W 4/00* (2009.01)
(52) U.S. Cl. .......... 370/341; 370/252; 375/350; 455/10
(58) Field of Classification Search .......... 370/252, 370/318, 328–341; 375/343–350; 455/10, 455/13.4
See application file for complete search history.

(56) References Cited

U.S. PATENT DOCUMENTS

| 5,479,362 A | 12/1995 | Sun et al. |
| 7,814,137 B1 * | 10/2010 | Mauer .......................... 708/300 |
| 8,023,409 B2 * | 9/2011 | Nguyen ...................... 370/235 |
| 2010/0196014 A1 * | 8/2010 | Bolla et al. .................... 398/141 |

FOREIGN PATENT DOCUMENTS

GB    2381417 A    4/2003

OTHER PUBLICATIONS

Partial International Search Report for corresponding International Patent Cooperation Treaty Application PCT/IB2009/000201, dated Sep. 23, 2009, 7 pages.
International Search Report and Written Opinion of the International Searching Authority for corresponding International Patent Cooperation Treaty Application PCT/IB2009/000201 dated Dec. 14, 2009, 13 pages.
Harri Holma and Antti Toskala (ed.), "WCDMA for UMTS : radio access for third generation mobile communications," Chichester ; New York : Wiley, c2000., p. 189.

* cited by examiner

*Primary Examiner* — Ricky Ngo
*Assistant Examiner* — Kan Yuen
(74) *Attorney, Agent, or Firm* — Squire Sanders (US) LLP

(57) ABSTRACT

Embodiments of the present invention provide methods, systems and apparatuses for optimizing downlink path loss (PL) measurements in time division duplex (TDD) systems enabling fast power control targeting to decrease fading margin. In one embodiment, a method of power control in a long term evolution time division duplex (TDD) system is provided. The method includes controlling a length of a path loss measurement filter based on an allocation type. A width and frequency position of the path loss measurement filter is made dependent on the allocation type.

4 Claims, 11 Drawing Sheets

POWER CONTROL ARRANGEMENT FOR LONG TERM ELVOLUTION TIME DIVISION DUPLEX METHOD AND APPARATUS

RELATED APPLICATION

This application was originally filed as PCT Application No. PCT/IB2009/000201 filed Feb. 4, 2009, which claims priority benefit from U.S. Provisional Patent Application No. 61/006,900, filed Feb. 5, 2008.

BACKGROUND

1. Field

Embodiments of the invention relate to communications networks and particularly to wireless communications networks, such as the Universal Mobile Telecommunications System (UMTS) Terrestrial Radio Access Network (UTRAN) Long Term Evolution (LTE) and Evolved UTRAN (E-UTRAN). More specifically, certain embodiments of the invention are directed to methods, systems and apparatuses for power control in E-UTRAN time division duplex (TDD) systems.

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3GPP standard that provides for an uplink speed of up to 50 megabits per second (Mbps) and a downlink speed of up to 100 Mbps. As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support.

SUMMARY

In one embodiment, a method of power control in a long term evolution time division duplex (TDD) system is provided. The method includes controlling, by a controller in a long term evolution TDD system, a length of a path loss measurement filter based on an allocation type. The method may further include making or causing the width and frequency position of the path loss measurement filter dependent on the allocation type.

In another embodiment, an apparatus for power control in a long term evolution time division duplex (TDD) system is provided. The apparatus includes a controller configured to control a length of a path loss measurement filter based on an allocation type. The apparatus or controller may be further configured to make or cause the width and frequency position of the path loss measurement filter dependent on the allocation type.

According to an embodiment, an apparatus for power control in a long term evolution time division duplex (TDD) system is provided. The apparatus includes controlling means for controlling a length of a path loss measurement filter based on an allocation type. The apparatus may further include causing means for causing the width and frequency position of the path loss measurement filter dependent on the allocation type.

According to another example, a method of power control in a long term evolution time division duplex (TDD) system is provided. The method includes measuring attenuation from a plurality of sub-bands of a frequency spectrum in which a physical uplink control channel is being transmitted. The method may further include calculating a path loss measurement as an average of the measurement from each of the plurality of sub-bands of the frequency spectrum.

In a further embodiment, an apparatus for power control in a long term evolution time division duplex (TDD) system is provided. The apparatus includes a controller configured to measure attenuation from both edges of a frequency spectrum in which a physical uplink control channel is being transmitted. The apparatus or controller may be further configured to calculate a path loss measurement as an average of the measurement from each of the edges of the frequency spectrum.

In another embodiment, an apparatus for power control in a long term evolution time division duplex (TDD) system is provided. The apparatus includes measuring means for measuring attenuation from both edges of a frequency spectrum in which a physical uplink control channel is being transmitted. The apparatus may further include calculating means for calculating a path loss measurement as an average of the measurement from each of the edges of the frequency spectrum.

According to a further example, a computer program embodied on a computer readable medium is provided. The computer program is configured to control a processor to control a length of a path loss measurement filter based on an allocation type, and to make or cause the width and frequency position of the path loss measurement filter dependent on the allocation type.

In another embodiment, a computer program embodied on a computer readable medium is provided. The computer program is configured to control a processor to measure attenuation from both edges of a frequency spectrum in which a physical uplink control channel is being transmitted, and to calculate a path loss measurement as an average of the measurement from each of the edges of the frequency spectrum.

BRIEF DESCRIPTION OF THE DRAWINGS

For proper understanding of the invention, reference should be made to the accompanying drawings, wherein.

DETAILED DESCRIPTION

It will be readily understood that the components of the present invention, as generally described and illustrated in the figures herein, may be arranged and designed in a wide variety of different configurations. Thus, the following more detailed description of the embodiments of the apparatuses, systems, and methods of the present invention, as represented in the attached figures, is not intended to limit the scope of the invention, as claimed, but is merely representative of selected embodiments of the invention.

Adaptive Modulation and Coding (AMC), Adaptive Transmission Bandwidth (ATB), and Hybrid Automatic Repeat Request (HARQ) are the fast link adaptation schemes used in the long term evolution (LTE) system. These schemes are widely used with dynamically scheduled Physical Uplink Shared Channel (PUSCH). The Physical Uplink Control Channel (PUCCH) and persistent PUSCH are channels where the link adaptation capability by means of fast AMC/ATB/HARQ is very limited if not completely impossible. In order to guarantee the Quality of Service (QoS) of persistently allocated PUSCH and PUCCH, the fast fading margin should be taken into account in the resource allocation. The extra margin needs to be compensated either via higher coding gain (PUSCH) which results in waste of resources, or higher transmission power requirement (PUCCH) resulting in both decreased coverage and increased interference to the other cells. Therefore, to overcome the problems outlined above, embodiments of the present invention provide methods, systems and apparatuses for optimizing downlink path loss (PL) measurements in time division duplex (TDD) systems enabling fast power control targeting to decrease fading margin.

TDD generally refers to a transmission scheme that allows an asymmetric flow for uplink and downlink transmission. In a TDD system, a common carrier may be shared between the uplink and downlink, with the resource being switched in time. Users may then be allocated one or more time slots for uplink and downlink transmission.

Figure 11:
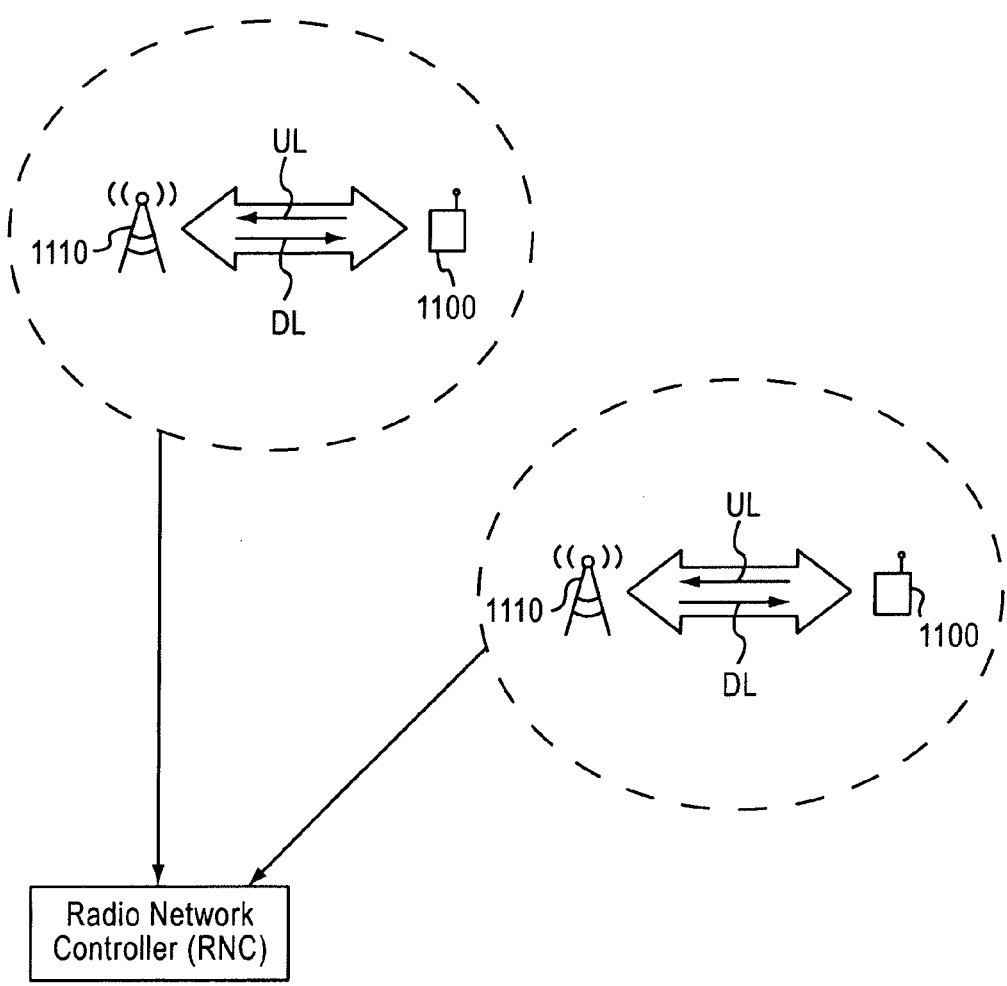
FIG. 11 illustrates a TDD system according to an embodiment of the invention.

FIG. 11 illustrates one example of a TDD system. User equipment (UE) 1100 are in communication with base stations (or NodeBs) 1110 via uplink and downlink connections. The uplink connections may include a Physical Uplink Shared Channel (PUSCH) and a Physical Uplink Control Channel (PUCCH). The base stations 1110, in turn, may communicate with at least one radio network controller (RNC) 1120.

Embodiments of the invention relate to the uplink (UL) part of the UTRAN Long Term Evolution (LTE). More specifically, examples of the invention provide TDD optimized fast power for both persistently allocated PUSCH and (UL) PUCCH.

Regarding the PUCCH, in one embodiment of the invention, the PUCCH is transmitted on the band edges applying slot-based frequency hopping symmetrically over the center frequency. Different user equipments (UEs) may be multiplexed by means of Code Division Multiplexing (CDM). It is possible to transmit persistent PUSCH in the same way using slot-based frequency hopping over the center frequency. Furthermore, various PUSCH frequency hopping schemes can be used which enable PUSCH hopping according to a predetermined hopping pattern. Resource allocation for these hopping schemes can be either semi-persistent (i.e., higher layer configured) or dynamic (i.e., via UL grant).

With respect to the power control (PC), combined open loop/closed loop operation may be used. The PC formula for the PUCCH operating at the user equipment (UE) side is given by:

$$P = \min(P_{max}, 10 \log 10(M) + P_o + \alpha PL + \Delta_{mcs} + f(\Delta_i)),$$

where $P_{max}$ is a maximum allowed UE power, M is a number of assigned resource blocks, $\alpha$ is a path loss compensation factor, $P_o$ is a cell and UE specific scaling parameter, PL is a downlink path loss measured at the UE. $\Delta_{mcs}$ is a MCS specific value, and $f(\Delta_i)$ is a UE specific closed loop correction value. Full path loss compensation may be used ($\alpha=1$) on PUCCH.

It is noted that, with respect to the UL PC in a TDD system, it is possible to compensate not only the slow fading (i.e., distance dependent path loss+shadow fading) but also the fast fading component based on the downlink (DL) measurement. This is because of the channel reciprocity, which is a special property of TDD compared with frequency division duplex (FDD). As UL and DL are transmitted using the same frequency band, the instantaneous channel attenuation measured in DL will be the same for both links. The invention, in one example, addresses the optimized downlink path loss (PL) measurement in TDD system.

Regarding the PUSCH, embodiments of the invention apply fast open loop power control when PUSCH is persistently or semi-persistently allocated. The same may also apply to the dynamically scheduled PUSCH. In a TDD system, the fast fading compensation can be realized by using a shorter filtering period in the channel attenuation measurement than what is used in case of dynamic PUSCH. Thus, according to one embodiment of the invention, the length of path loss measurement filter (in time) is controlled based on the allocation type.

Additionally, embodiments of the invention provide that the width (in frequency) and frequency position of the path loss measurement filter is made dependent on the allocation type. In a TDD system using fast fading compensation, the path loss measurement is made over the allocated bandwidth. Whereas, in the case with no fast fading compensation, the path loss measurement is made over the total bandwidth.

Figure 8:
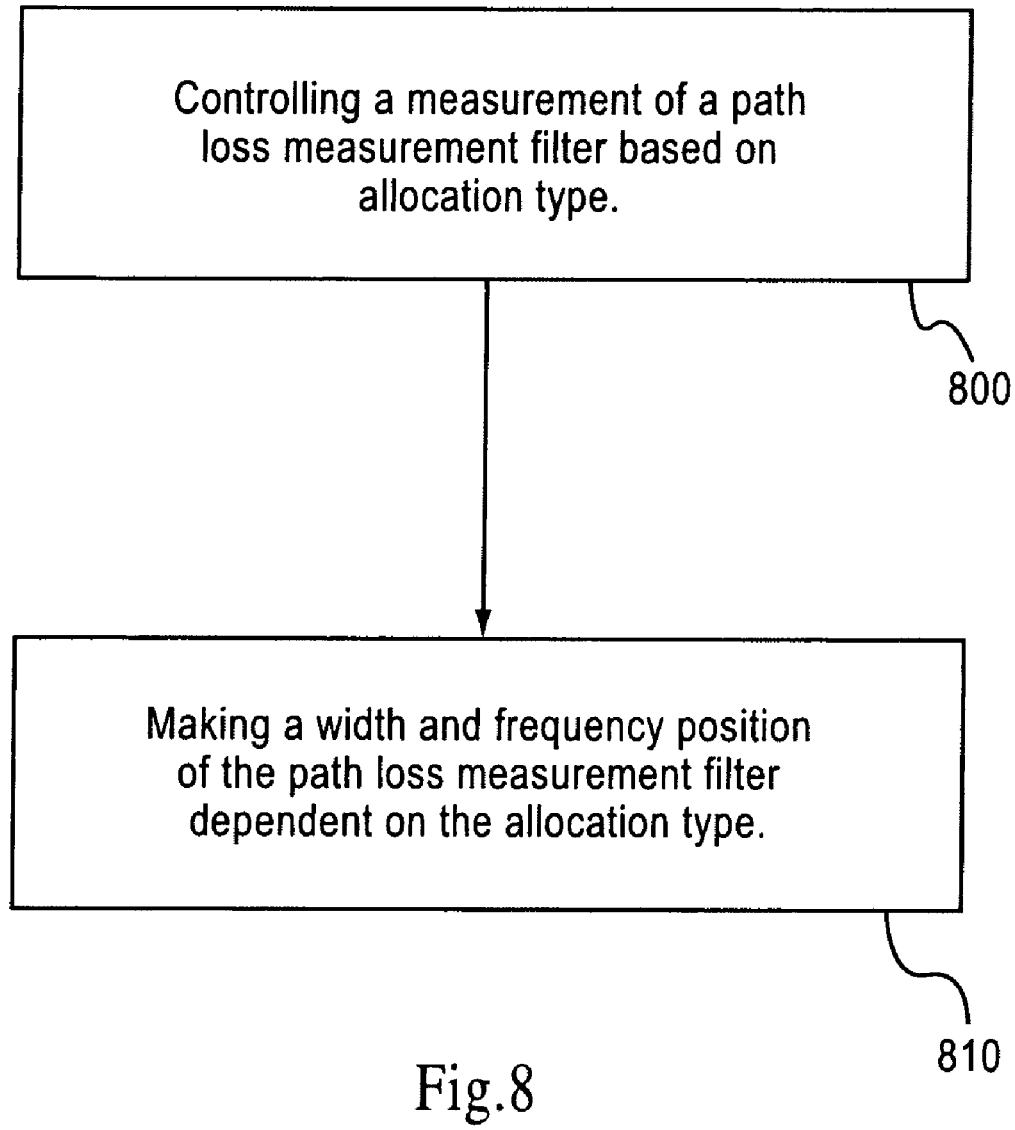
FIG. 8 illustrates a method of power control according to one embodiment of the invention.

Thus, embodiments of the invention provide a method for power control in communications systems, such as UTRAN TDD systems. As illustrated in FIG. 8, the method may include controlling a measurement of a path loss measurement filter based on the allocation type 800 (e.g. whether the channel is persistently allocated), and making a width and frequency position of the path loss measurement filter dependent on the allocation type 810.

With respect to the PUCCH, examples of the invention provide a specific arrangement for the channel attenuation measurement. Attenuation is measured from both edges (two clusters) of the frequency spectrum in which the PUCCH is being transmitted. The path loss (PL) measurement is calculated as an average over both measurements as follows:

$$PL = \frac{P_1 + P_2}{2},$$

where $P_1$ is the instantaneous channel attenuation measurement from the first edge band and $P_2$ is the attenuation measured from the second edge band, respectively. The same rules could also be used with persistently allocated PUSCH using frequency hopping.

Similarly, rather than measuring attenuation at only two edges, embodiments of the invention may measure attenuation at any number of clusters (or sub-bands). As such, the path loss (PL) measurement may be averaged over any number of clusters or sub-bands. In this case, the path loss (PL) measurement may be calculated as an average of a plurality of measurements as follows:

$$PL = (P_1 + P_2 + \ldots + P_N)/N$$

where $P_1, P_2, \ldots P_N$ are instantaneous channel attenuation measurements from a plurality of clusters. Again, the same rules could also be used with persistently allocated PUSCH using frequency hopping.

Additionally, in the case of clustered resource blocks (RB) mapping, the path loss measurement can be performed independently per cluster. As an example, if there are two clusters, a cluster-specific path loss (PL) measurement could be applied instead of averaging the path loss (PL) measurement over two clusters as described above.

An antenna configuration (MIMO mode) dependent combination of the channel attenuation measurement, e.g. if eNodeB is configured as 2Tx-2Rx and UE is configured as 1Tx-2Rx, can be, for example, as follows (assuming eNB using MRC):

$$P_t = \frac{P_{r1} + P_{r2}}{2}$$

where $P_t$ is the combined channel attenuation between one of the UE antenna (the one used for Tx in the UL) and two eNB Tx antenna (both used for Rx in UL), $P_{r1}$ and $P_{r2}$ are the measured channel attenuation from two paths, respectively. A calibration correction factor, which calibrates the UL/DL Tx-Rx chain, may be included in UE specific parameters in the PC formula, e.g. $P_o$.

Figure 10:
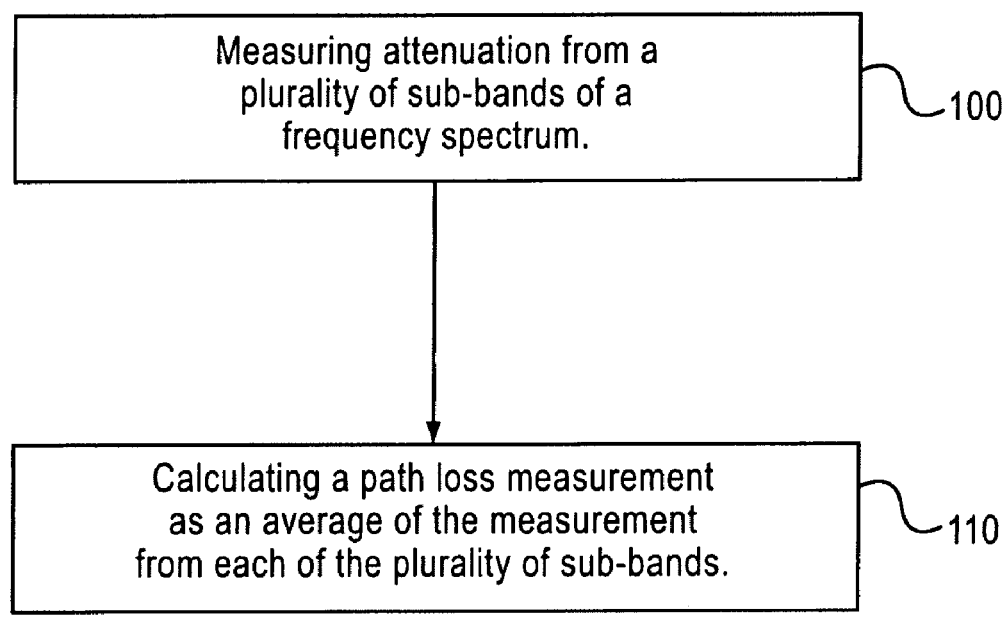
FIG. 10 illustrates a method according to another embodiment of the invention.

Embodiments of the invention therefore also provide a method of power control in a communication system as illustrated in FIG. 10. The method includes measuring attenuation from a plurality of sub-bands of a frequency spectrum 100, as outlined above. The method further includes calculating a path loss measurement as an average of the measurements taken from each of the plurality of sub-bands of the frequency spectrum 110.

Figure 9:
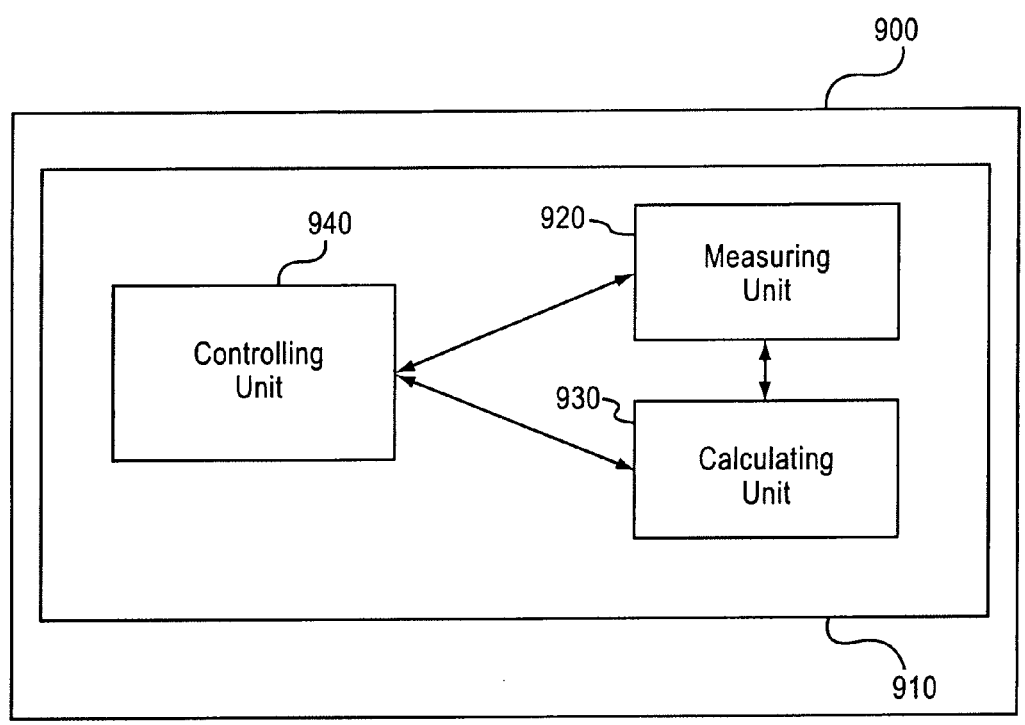
FIG. 9 illustrates an apparatus according to an embodiment of the invention.

According to another embodiment of the invention, an apparatus for power control in a communication system is provided. As illustrated in FIG. 9, the apparatus 900 may include a controller 910. The controller 910 may include a controlling unit 940 configured to control a length of a path loss measurement filter based on an allocation type. The controlling unit 940 may be further configured to make the width and frequency position of the path loss measurement filter dependent on the allocation type.

In an another embodiment of the invention, the controller 910 may further include a measurer or measuring unit 920 configured to measure attenuation from a plurality of sub-bands of a frequency spectrum in which a physical uplink control channel is being transmitted. The controller 910 may further include a calculator or calculating unit 930 configured to calculate a path loss measurement as an average of the measurements from each of the plurality of sub-bands of the frequency spectrum. In an alternative embodiment, the measuring unit 920 and/or calculating unit 930 may be implemented separately from the controller 910.

It should be noted that the apparatus 900 may be implemented with only the controller 910, only the controlling unit 940, only the measuring unit 920, only the calculating unit 930, or any combination of these elements. Additionally, the controller 910 may be implemented to directly perform the functions of the controlling unit 940, measuring unit 920, and calculating unit 930.

Embodiments of the invention result in improved capacity of the TDD system. In the case of persistently allocated PUSCH, up to a 50% resource saving may result based on the assumption that the link level gain from fast PC is similar to that in WCDMA.

Figure 1:
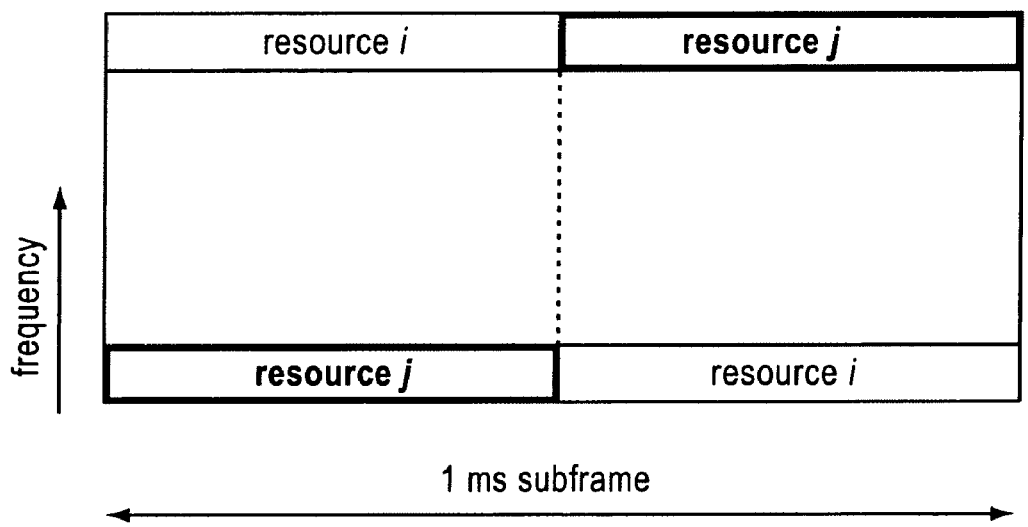
FIG. 1 illustrates a transmission format of PUCCH, according to one embodiment of the invention.
Figure 2:
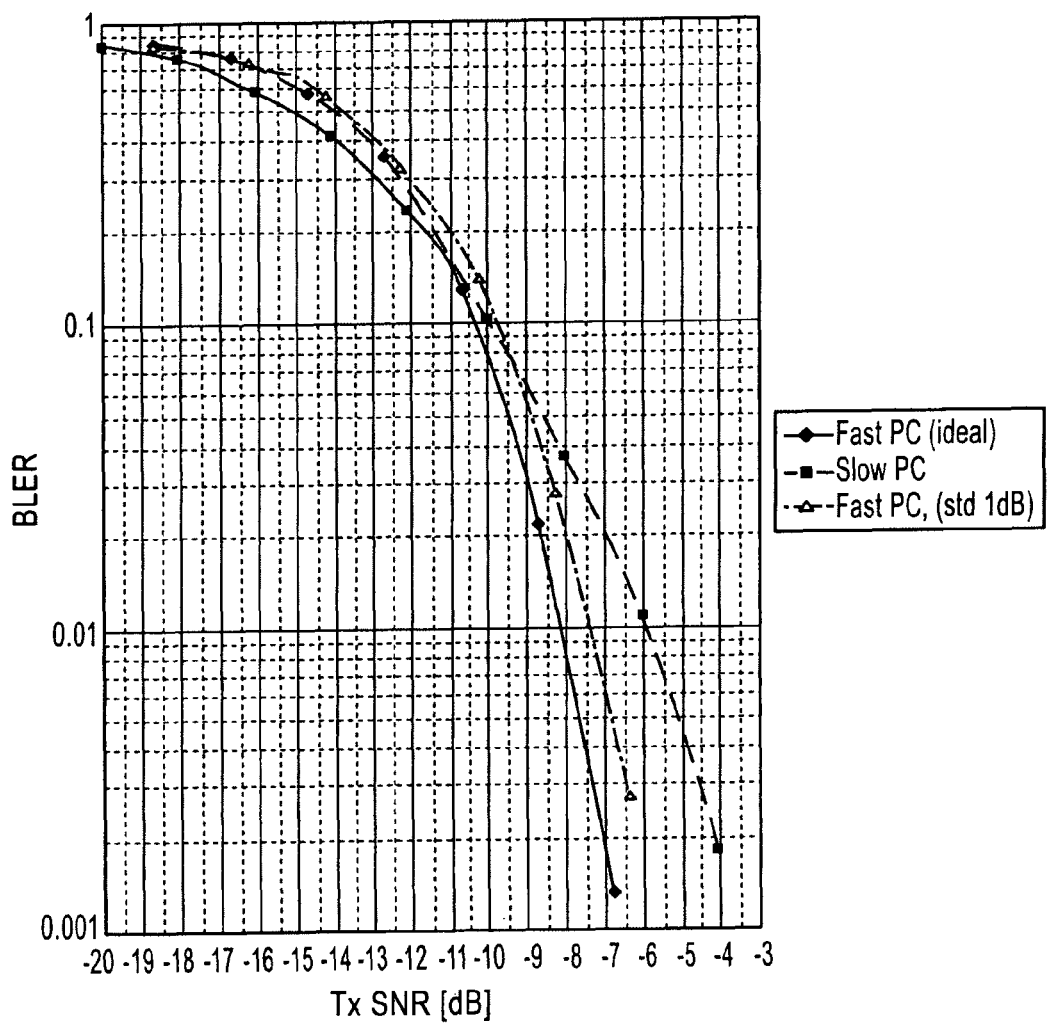
FIG. 2 illustrates a block error rate of 5 bits word as function of transmitted SNR, according to an embodiment of the invention.
Figure 3:
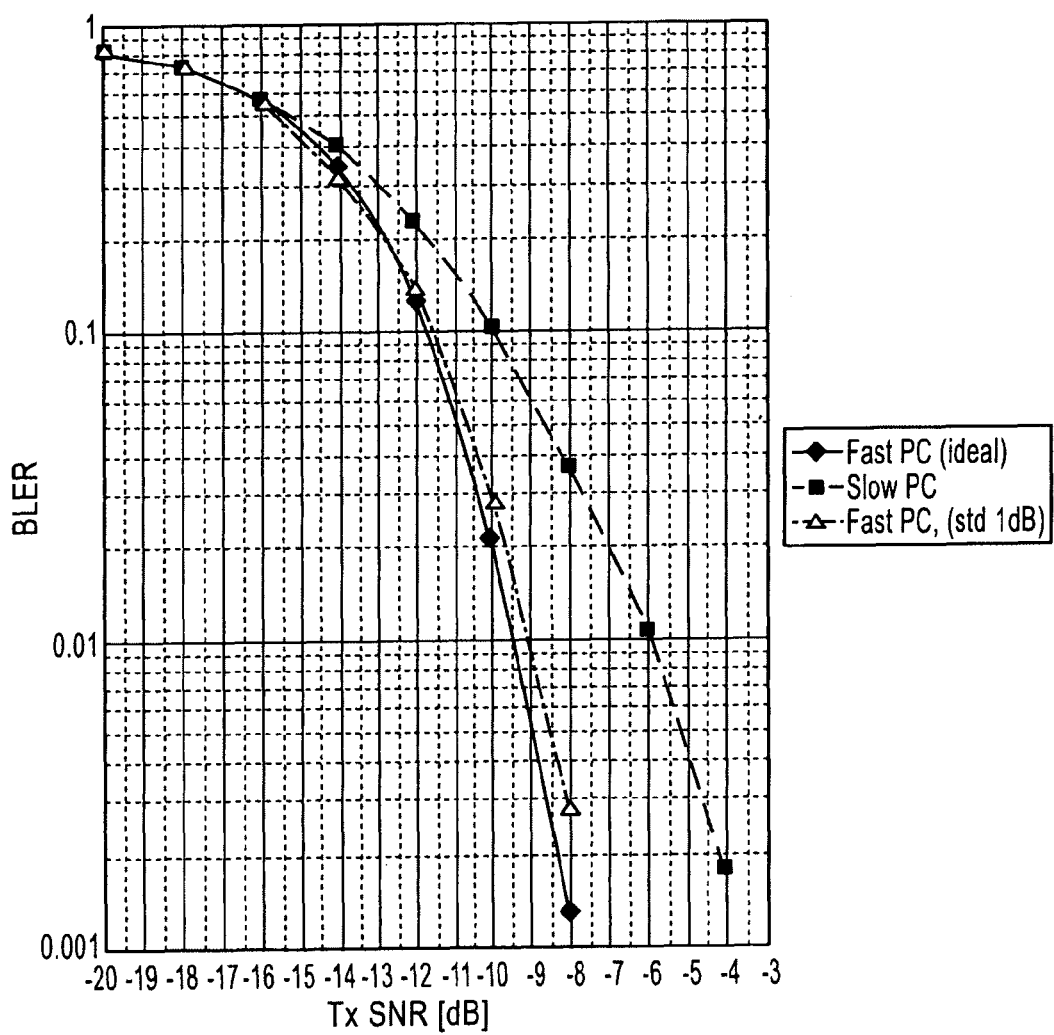
FIG. 3 illustrates a block error rate of 5 bits word as function of received SNR, according to an embodiment of the invention.

In PUCCH, the link level gain in terms of Tx power is shown in FIG. 2 and the link level gain in terms of Rx power is shown in FIG. 3. Results are generated for both ideal PC and more realistic PC scheme including log-normally distributed measurement error. For block error rates (BLER) of about 1%, results show about 2 dB gain in terms of average Tx power reduction and 3 dB gain in terms of average received power reduction.

Figure 4:
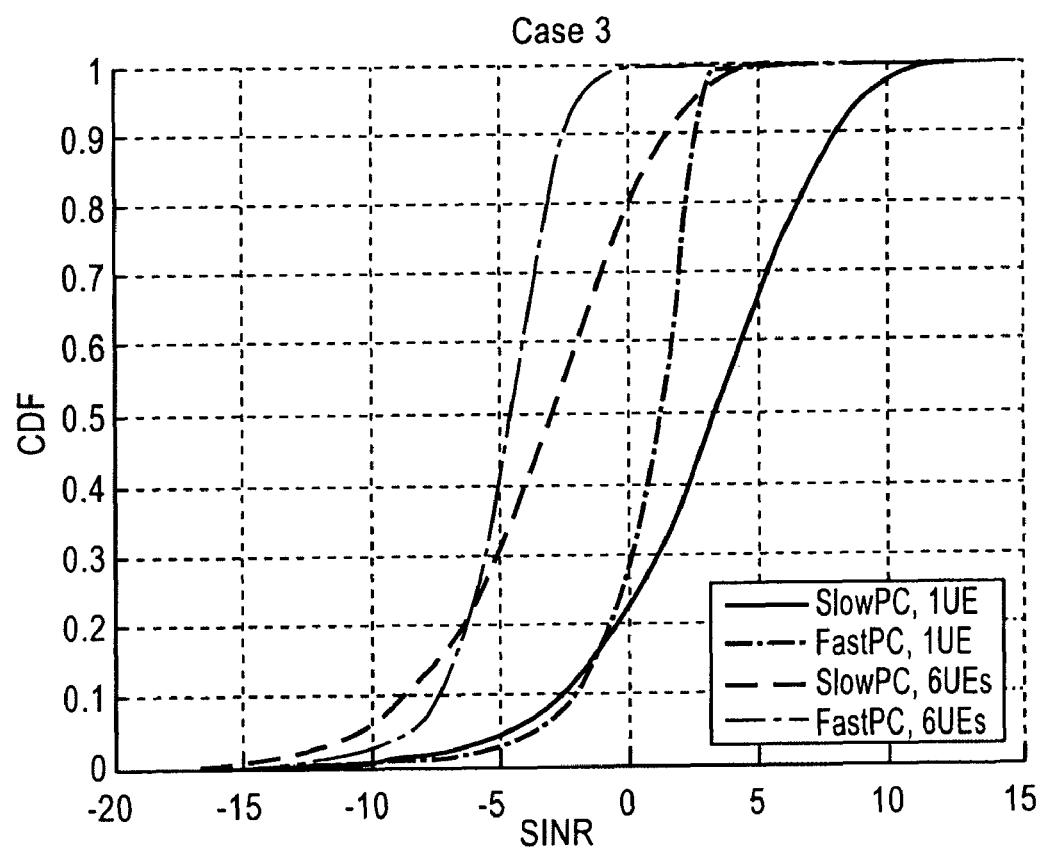
FIG. 4 illustrates PUCCH SINR distribution for different types of power control and multiplexing order, according to one example of the invention.
Figure 5:
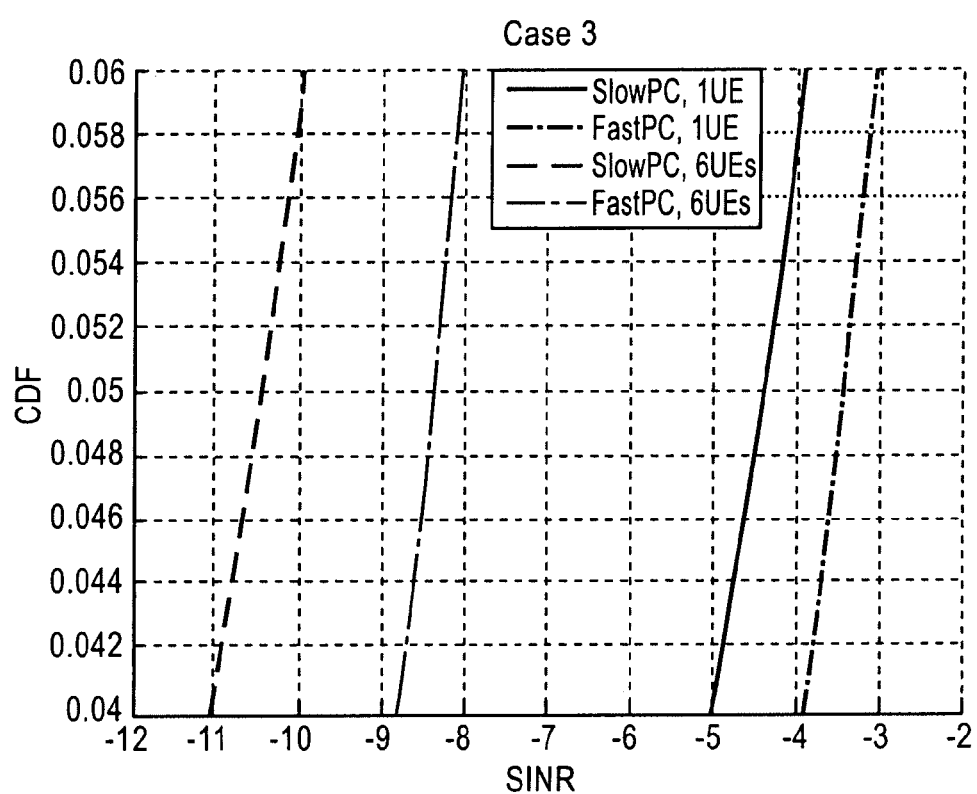
FIG. 5 illustrates PUCCH SINR distribution, TU 3 km/h zoomed in to 95% coverage point, according to one embodiment of the invention.

Regarding system level gain, there are at least the following different gain components:
  Improved link performance due to improved orthogonality between intra cell users as the variance of Rx powers over UEs is reduced. This results in increased coverage or higher multiplexing capability on PUCCH.
  Reduced Tx power resulting in decreased interference to adjacent cells, as shown in FIG. 4 and FIG. 5. This is due to the reduced variance of the received SINR shown in FIG. 6. When SINR variance is reduced, the SINR target may be decreased which results in a decrease of mean UE transmit power.

Figure 6:
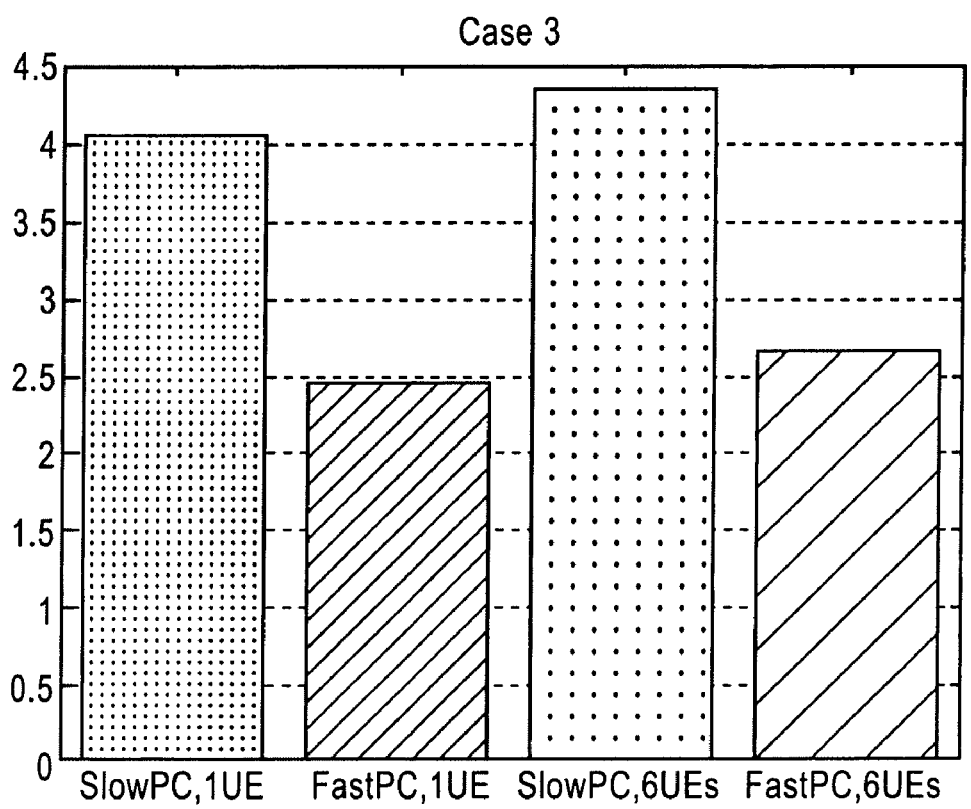
FIG. 6 illustrates a standard deviation of PUCCH SINR, in one embodiment of the invention.
Figure 7:
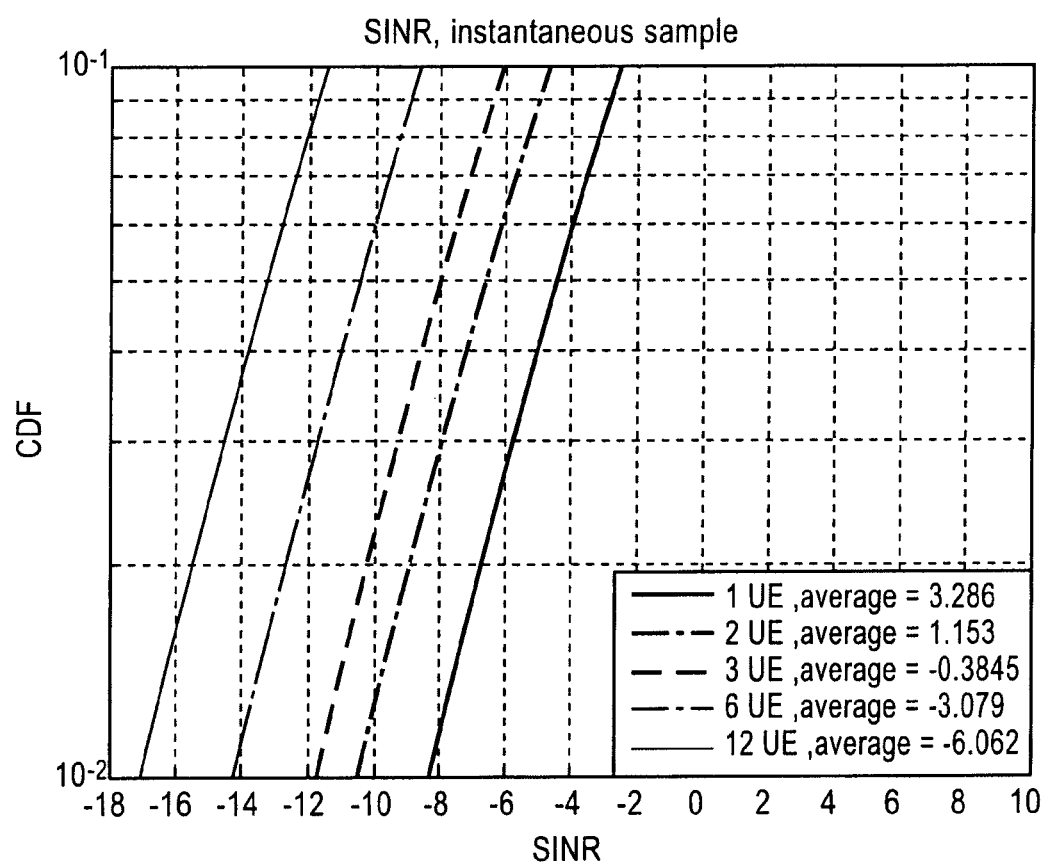
FIG. 7 illustrates SINR for Slow power control with optimal power control parameters, according to one example of the invention.

The gain from improved orthogonality is not taken into account in the system level results shown in FIGS. 4-6. Moreover, PUCCH hopping was not applied. Comparing FIG. 5 and FIG. 7 it is noted that, with fast PC, at least 6 UEs can be supported. While for slow PC, 3 UEs can be supported if the coverage limit is −9 dB. So with fast PC operating on the PUCCH only half the PUCCH resources are needed to support the same number of users.

Thus, in view of the above, embodiments of the present invention provide a method of power control in a long term evolution time division duplex (TDD) system. The method includes controlling a length of a path loss measurement filter based on an allocation type. A width and frequency position of the path loss measurement filter is made dependent on the allocation type. Accordingly, in one embodiment of the invention, a fast open loop power control is applied when PUSCH is persistently allocated.

Embodiments of the invention also provide an apparatus for power control in a long term evolution time division duplex (TDD) system. The apparatus includes a controller configured to control a length of a path loss measurement filter based on an allocation type. The apparatus may be configured to make the width and frequency position of the path loss measurement filter dependent on the allocation type.

According to another embodiment of the invention, a method of power control in a long term evolution time division duplex (TDD) system is provided. The method includes measuring attenuation from both edges of a frequency spectrum in which a physical uplink control channel is being transmitted. The method may further include calculating a path loss measurement as an average of the measurement from each of the edges of the frequency spectrum.

In another embodiment of the invention, an apparatus for power control in a long term evolution time division duplex (TDD) system is provided. The apparatus includes a measurer configured to measure attenuation from both edges of a frequency spectrum in which a physical uplink control channel is being transmitted. The apparatus may further include a calculator configured to calculate a path loss measurement as an average of the measurement from each of the edges of the frequency spectrum.

Additional embodiments of the invention include a computer program embodied on a computer readable medium. The computer program may be configured to control a processor, processing device, and/or computer to perform certain steps or instructions. The steps may include controlling a length of a path loss measurement filter based on an allocation type, and causing a width and frequency position of the path loss measurement filter to be dependent on the allocation type.

In another example, a computer program, embodied on a computer readable medium, may be configured to control a processor to measure attenuation from both edges of a frequency spectrum in which a physical uplink control channel is being transmitted. The computer program may further control the processor to calculate a path loss measurement as an average of the measurement of said attenuation from each of the edges of the frequency spectrum.

A computer readable medium disclosed herein may include a variety of memory mediums including, for example, all forms of volatile memory or nonvolatile memory. Memory may include RAM, optical discs, hard drives/discs, flash memory, or any other type of storage or memory capable of storing a computer program or of being accessed by a computer or processor.

User equipment (UE), as described herein, may include a wired or wireless device capable of communicating with any communications system or network. Such devices may include a mobile telephone, computer, laptop, personal digital assistant, or any other devices capable of communicating with a network.

It should be noted that some of the functional units and/or elements described in this specification have been presented as a controller or processor in order to more particularly emphasize their implementation independence. A controller or processor may be implemented as a hardware circuit comprising custom VLSI circuits or gate arrays, off-the-shelf semiconductors such as logic chips, transistors, or other discrete components. Additionally, functions performed by a controller or processor may be performed with the cooperation of other components described herein. For example, a controller or processor may be configured to perform operations described herein by executing one or more segments of code stored in a volatile or nonvolatile memory. Additionally, a controller or processor may include multiple processors or processing devices depending upon the embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment, and in any combination or order.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method comprising:
controlling, by a controller, a length of a path loss measurement filter based on an allocation type; and
making, by the controller, a width and frequency position of the path loss measurement filter to be dependent on the allocation type,
wherein said controlling comprises controlling by said controller, in a long term evolution time division duplex system, the length of the path loss measurement filter based on the allocation type, and
wherein, when said time division duplex system does not use any fast fading compensation, a path loss measurement is calculated over a total bandwidth.

2. The method of claim 1, wherein, when said time division duplex system uses a fast fading compensation, the path loss measurement is calculated over an allocated bandwidth.

3. An apparatus comprising:
a controller configured to:
control a length of a path loss measurement filter based on an allocation type, and
make a width and frequency position of the path loss measurement filter to be dependent on the allocation type,
wherein said controller is a controller in a long term evolution time division duplex system, and
wherein, when said time division duplex system does not use any fast fading compensation, a path loss measurement is calculated over a total bandwidth.

4. The apparatus of claim 3, wherein, when said time division duplex system uses a fast fading compensation, the path loss measurement is calculated over an allocated bandwidth.

* * * * *